US009429114B2

(12) United States Patent
Dudar et al.

(10) Patent No.: US 9,429,114 B2
(45) Date of Patent: Aug. 30, 2016

(54) SYSTEM AND METHODS FOR EVAPORATIVE EMISSIONS LEAK TESTING

(71) Applicant: Ford Global Technologies, LLC, Dearborn, MI (US)

(72) Inventors: Aed M. Dudar, Canton, MI (US); Robert Roy Jentz, Westland, MI (US); Jason Chung, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/575,660

(22) Filed: Dec. 18, 2014

(65) Prior Publication Data

US 2016/0177882 A1 Jun. 23, 2016

(51) Int. Cl.

| | |
|---|---|
| ***B60L 9/00*** | (2006.01) |
| ***F02M 33/02*** | (2006.01) |
| ***F17D 1/00*** | (2006.01) |
| ***F02M 25/08*** | (2006.01) |
| ***F02D 41/00*** | (2006.01) |
| ***F02D 41/24*** | (2006.01) |

(52) U.S. Cl.
CPC ........ *F02M 25/0809* (2013.01); *F02D 41/003* (2013.01); *F02D 41/2406* (2013.01); *F02M 25/0854* (2013.01)

(58) Field of Classification Search
USPC ............................... 701/22; 123/520; 137/12
See application file for complete search history.

(56) References Cited

U.S. PATENT DOCUMENTS 5,396,873 A * 3/1995 Yamanaka ......... F02M 25/0809 123/520
6,050,245 A * 4/2000 Cook .................... F02B 23/104 123/458
6,546,955 B1 * 4/2003 Burke .................. F02M 25/089 123/516
8,739,766 B2 6/2014 Jentz et al.
2011/0166765 A1 * 7/2011 DeBastos ......... B60K 15/03504 701/102
2011/0168140 A1 * 7/2011 DeBastos ........... F02M 25/0818 123/521
2012/0047999 A1 * 3/2012 Itoh .................... F02M 25/0818 73/40
2012/0211087 A1 * 8/2012 Dudar ................. F02D 41/0032 137/12
2013/0037007 A1 2/2013 Reddy
2013/0312713 A1 * 11/2013 McLain ................. F02M 25/08 123/520

OTHER PUBLICATIONS

Anonymous, "Leak Detection With Combined Pressure and Temperature Information," IPCOM No. 000241546, Published May 8, 2015, 2 pages.
Anonymous, "Evaluation of Equilibrium of Vapor (EOEV) for Fuel Storage Leak Detection," IPCOM No. 000236096, Published Apr. 4, 2014, 2 pages.

* cited by examiner

*Primary Examiner* — Thomas G Black
*Assistant Examiner* — Tyler Paige
(74) *Attorney, Agent, or Firm* — James Dottavio; Alleman Hall McCoy Russell & Tuttle LLP

(57) ABSTRACT

A method for a fuel system is provided, comprising: during a first engine-off condition, coupling a fuel tank to a fuel vapor canister, and indicating degradation based on a change in pressure at the fuel vapor canister, and during a second engine-off condition, coupling the fuel vapor canister to an intake of an engine, and indicating degradation based on a change in pressure at the fuel vapor canister. The first engine-off condition may include an absolute fuel tank pressure greater than a threshold, while the second engine-off condition may include an engine spinning unfueled. In this way, a vacuum or pressure may be applied to the fuel vapor canister during an engine-off condition without requiring a dedicated vacuum pump coupled to the fuel vapor canister.

18 Claims, 5 Drawing Sheets

SYSTEM AND METHODS FOR EVAPORATIVE EMISSIONS LEAK TESTING

BACKGROUND AND SUMMARY

Vehicle emission control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of leaks that could release fuel vapors to the atmosphere.

A typical method of testing for the presence of leaks in an emission control system includes applying a vacuum to a fuel system that is otherwise sealed. An intact fuel system may be indicated if a threshold vacuum is met. In some examples, the fuel system may be sealed while containing a vacuum, and an intact fuel system may be indicated if the rate of vacuum bleed-up is less than a threshold. Failure to meet these criteria may indicate degradation in the fuel system. In some examples, an intake manifold vacuum may be used as the vacuum source applied to the emissions control system. However, hybrid-electric vehicles (HEVs) have limited engine run time, and may thus have limited opportunities to perform such a test. Further, in order to improve fuel efficiency, vehicles may be configured to operate with a low manifold vacuum, and may thus have limited opportunities with sufficient vacuum to perform a leak test.

In order to meet emissions regulations, such vehicles are required to include an on-board vacuum pump, which may be included in an evaporative leak check module (ELCM). The ELCM may be coupled to the evaporative emissions system, within a canister vent line, for example. The ELCM may thus supply the vacuum for appropriate leak tests. However, installing an ELCM in a vehicle is a relatively expensive manufacturing cost, which increases with a correlation to evaporative emissions system and fuel tank volume. Further, in applying a vacuum to the fuel tank, the ELCM draws fuel vapor into the fuel vapor canister. This may require an increase in canister size and/or the addition of an additional bleed canister in order to prevent bleed emissions in hybrid vehicles, which have limited opportunities to purge the canister for the same reasons an ELCM is required in the first place.

The inventors herein recognized the above stated problems and issues and have developed systems and methods in order to at least partially address them. In one example, a method for a fuel system is provided, comprising: during a first engine-off condition, coupling a fuel tank to a fuel vapor canister, and indicating degradation based on a change in pressure at the fuel vapor canister, and during a second engine-off condition, coupling the fuel vapor canister to an intake of an engine, and indicating degradation based on a change in pressure at the fuel vapor canister. The first engine-off condition may include an absolute fuel tank pressure greater than a threshold, while the second engine-off condition may include an engine spinning unfueled. In this way, a vacuum or pressure may be applied to the fuel vapor canister during an engine-off condition without requiring a dedicated vacuum pump coupled to the fuel vapor canister.

In another example, a method for a fuel system is provided, comprising: during a first condition, responsive to a first absolute fuel tank pressure being less than a threshold, maintaining a fuel tank sealed for a threshold duration; indicating degradation of the fuel tank responsive to a second absolute fuel tank pressure being less than the threshold; responsive to the first absolute fuel tank pressure being greater than the threshold, coupling a fuel tank to a fuel vapor canister; and indicating degradation based on a change in pressure at the fuel vapor canister. The method allows for passive testing of the fuel tank and fuel vapor canister using fuel tank pressure accumulated over a diurnal cycle. In this way, the canister side of an emissions control system may be tested without saturating the fuel vapor canister with hydrocarbons, thereby decreasing bleed emissions.

In yet another example, a system for a hybrid-electric vehicle is provided, comprising: a fuel tank coupled to a fuel vapor canister via a fuel tank isolation valve; an engine intake coupled to the fuel vapor canister via a canister purge valve; a canister vent coupling the fuel vapor canister to atmosphere via a canister vent valve; a fuel tank pressure sensor coupled to the fuel tank; a canister vent pressure sensor coupled within the canister vent; and a controller configured with instructions stored in non-transitory memory, that when executed, cause the controller to: during a first engine-off condition, open the fuel tank isolation valve while maintaining the canister purge valve and canister vent valve closed, and indicate degradation based on a change in pressure at the canister vent pressure sensor; and during a second engine-off condition, open the canister purge valve while maintaining the canister vent valve and fuel tank isolation valve closed, and indicate degradation based on a change in pressure at the fuel vapor canister. By coupling separate pressure sensors to the fuel tank side and the canister side of the emissions control system, canister side leaks may be tested independently of the fuel tank pressure sensor. In this way, the fuel tank may remained sealed during some canister-side degradation tests, thereby maintaining fuel vapor isolated and reducing the transfer of fuel vapor to the fuel vapor canister.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically shows an example vehicle propulsion system.

FIG. 2 schematically shows a fuel system and emissions system for a vehicle engine.

FIG. 4 shows an example flow chart for a high-level method for performing an evaporative emissions leak test in a hybrid-electric vehicle while the vehicle is on.

FIG. 5 shows an example flow chart for a high-level method for performing an evaporative emissions leak test in a hybrid-electric vehicle while the vehicle engine is on.

DETAILED DESCRIPTION

Figure 2:
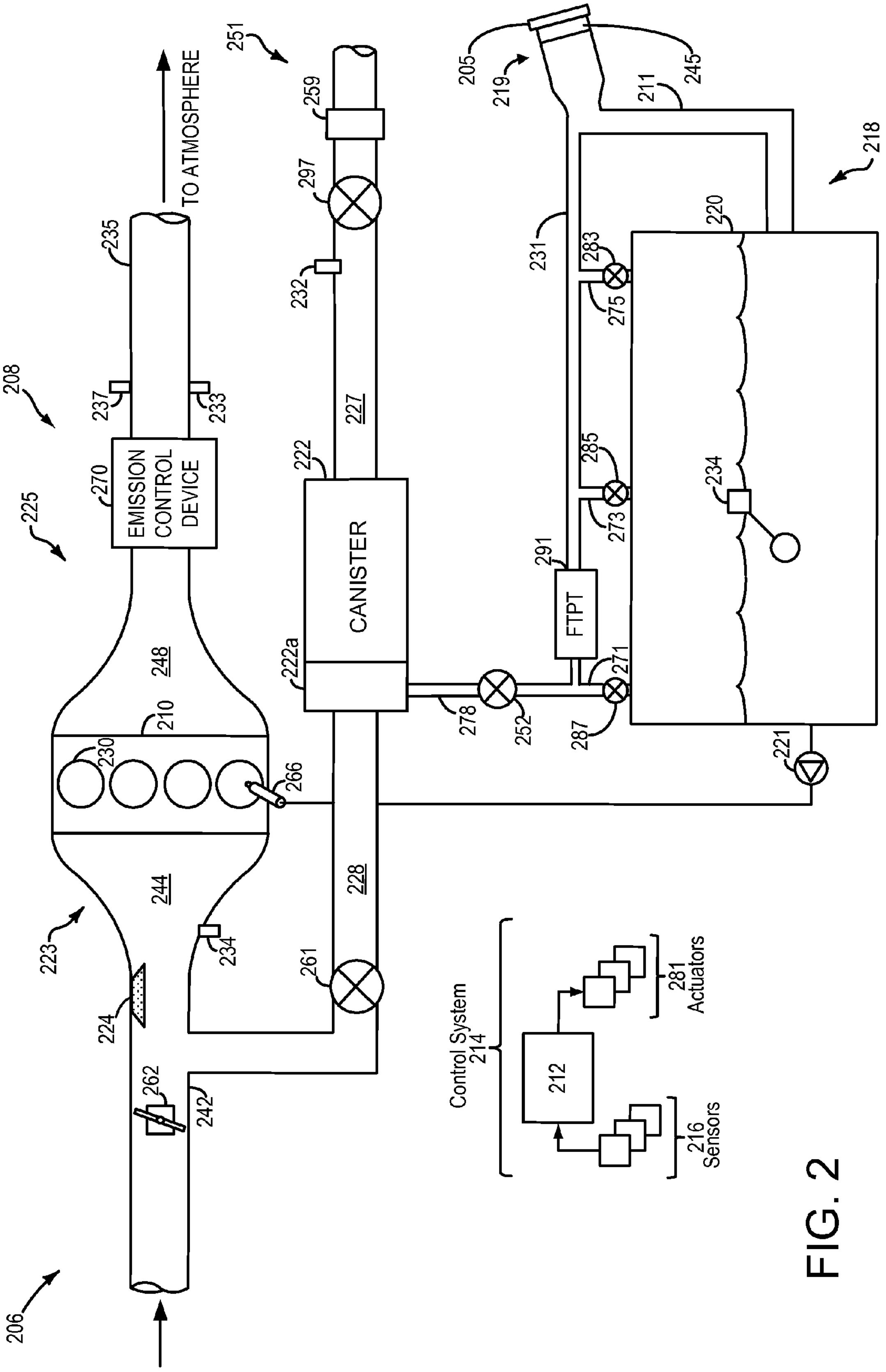
Figure 3:
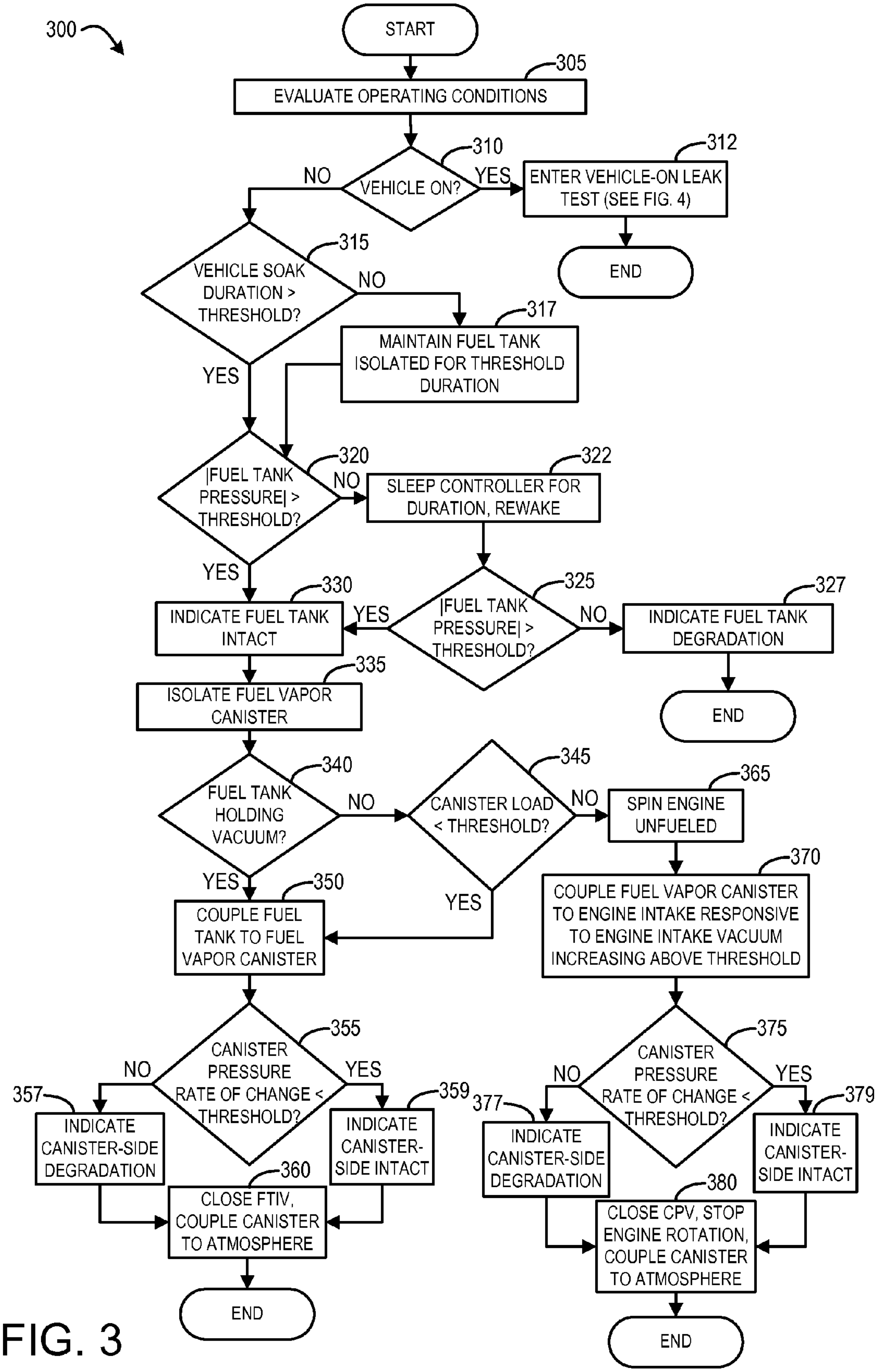
FIG. 3 shows an example flow chart for a high-level method for performing an evaporative emissions leak test in a hybrid-electric vehicle.
Figure 4:
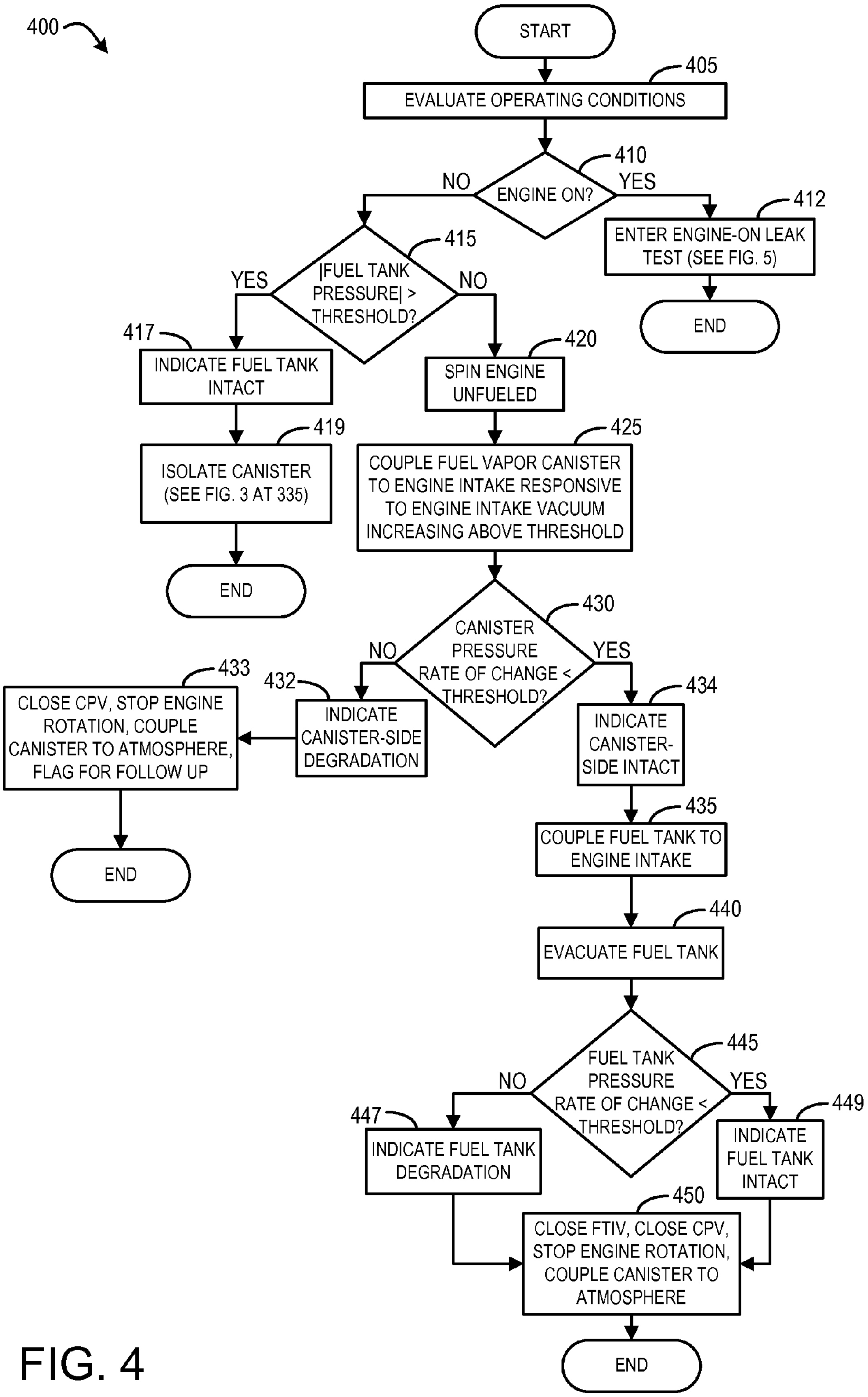
Figure 5:
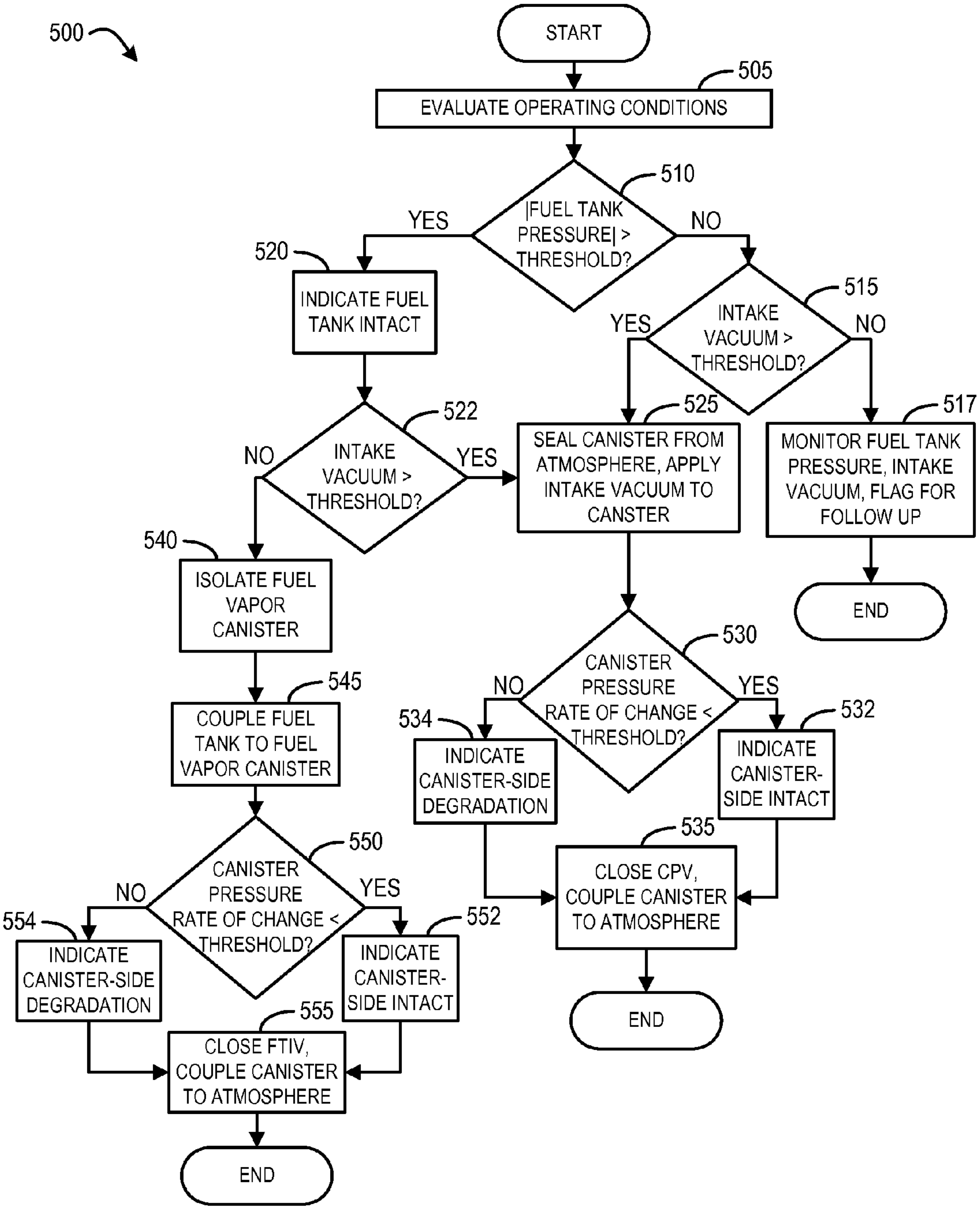

This detailed description relates to systems and methods for evaporative emissions leak testing. More specifically, the description relates to systems and methods for leak testing in hybrid-electric vehicles that do not require a dedicated vacuum pump, and that reduce the transfer of fuel vapor to the fuel vapor canister during testing. The method may be applied to a hybrid vehicle propulsion system, such as the system depicted in FIG. 1. The propulsion system may include an engine system, fuel system, and emissions control system, as depicted in FIG. 2. A method for performing an evaporative emissions leak test in a hybrid-electric vehicle is depicted in FIG. 3. A method for performing evaporative emissions leak tests during a vehicle-on condition is depicted in FIG. 4, while a method for performing evaporative emissions leak tests during an engine-on condition is depicted in FIG. 5.

Figure 1:
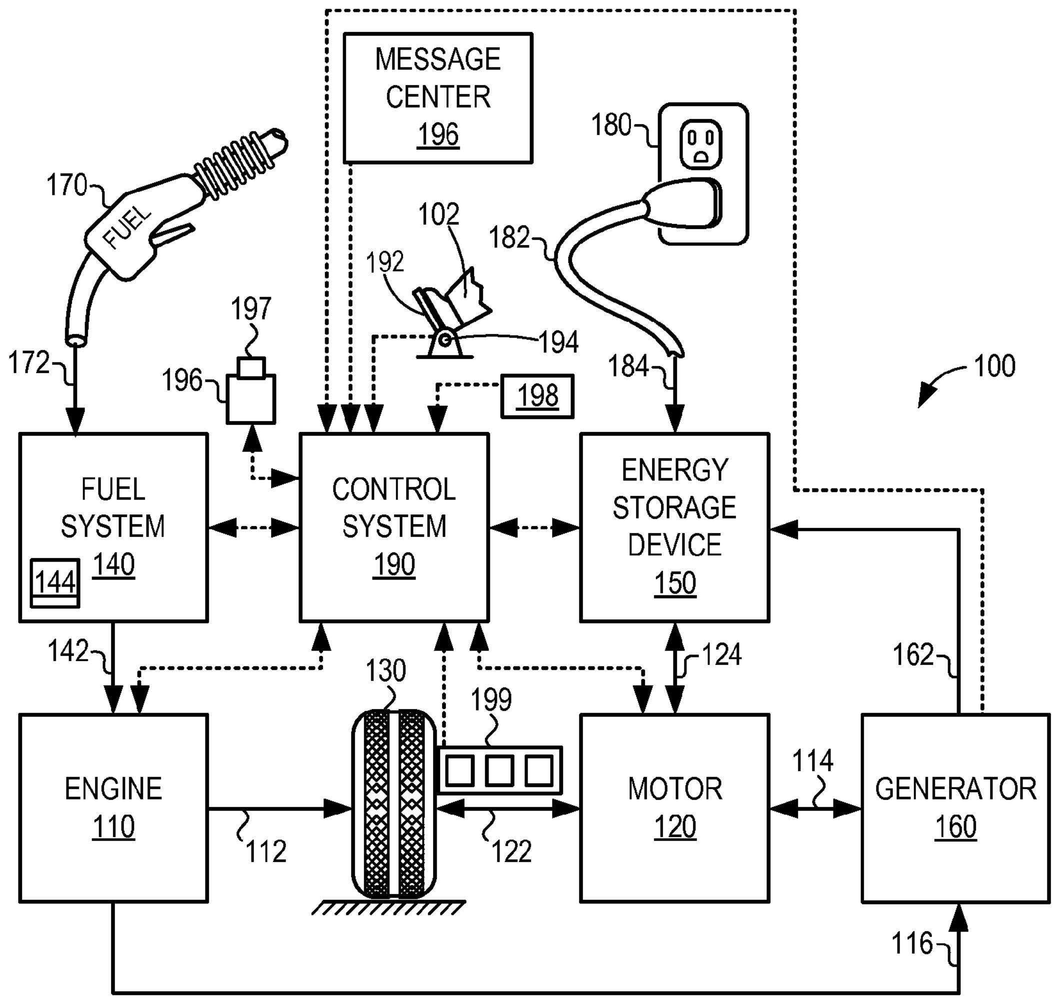

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

Engine 110 may be started with an engine starting system that includes motor 120 driven by energy from energy storage device 150. In another example, the starter may be a powertrain drive motor, such as a hybrid powerplant connected to the engine by way of a coupling device. The coupling device may include a transmission, one or more gears, and/or any other suitable coupling device. The starter may be configured to support engine restart at or below a predetermined near zero threshold speed (e.g., below 50 or 100 rpm). In other words, by operating motor 120, engine 110 may be spun. During some conditions, such as during a key-on condition when engine operation is desired for vehicle motion, the engine may be started (e.g., using motor assistance) and spun fueled (that is, with fuel and air being injected into engine cylinders) to enable cylinder combustion. During other conditions, as elaborated in FIGS. 3-5, such as during selected key-on or key-off conditions, the engine may be started with motor assistance and spun unfueled (that is, with no air or fuel injected into the engine cylinders) to generate intake vacuum. The engine may be spun until a threshold vacuum is generated after which the spinning may be stopped. The generated vacuum may be subsequently applied to fuel system 140 for leak detection diagnostics.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flows of FIGS. 3, 4, and 5, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system, and may include components as described for vehicle propulsion system 100.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer **222*a* (or buffer region), each of the canister and the buffer comprising the adsorbent. As shown, the volume of buffer 222*a* may be smaller than (e.g., a fraction of) the volume of canister 222. The adsorbent in the buffer 222*a* may be same as, or different from, the adsorbent in the canister (e.g., both may include charcoal). Buffer 222*a* may be positioned within canister 222** such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include universal exhaust gas oxygen (UEGO) sensor 237 located upstream of the emission control device, temperature sensor 233, pressure sensor 291, and canister temperature sensor 243. Other sensors such as pressure, temperature, air/fuel ratio, and composition sensors may be coupled to various locations in the vehicle system 206. As another example, the actuators may include fuel injector 266, throttle 262, fuel tank isolation valve 253, pump 292, and refueling lock 245. The control system 214 may include a controller 212. The controller may be shifted between sleep and wake-up modes for additional energy efficiency. During a sleep mode the controller may save energy by shutting down on-board sensors, actuators, auxiliary components, diagnostics, etc. Essential functions, such as clocks and controller and battery maintenance operations may be maintained on during the sleep mode, but may be operated in a reduced power mode. During the sleep mode, the controller will expend less current/voltage/power than during a wake-up mode. During the wake-up mode, the controller may be operated at full power, and components operated by the controller may be operated as dictated by operating conditions. The controller may receive input data from the various sensors, process the input data, and trigger the actuators in response to the processed input data based on instruction or code programmed therein corresponding to one or more routines. Example control routines are described herein with regard to FIGS. 3-5.

In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere. A vent line pressure transducer (VLPT) 232 may be disposed within vent line 227 between canister 222 and CVV 297.

Leak detection routines may be intermittently performed by controller 212 on fuel system 218 and emissions control system 251 to confirm that the systems are not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. However, installing a vacuum pump in a vehicle is a relatively expensive manufacturing cost, which increases with a correlation to evaporative emissions system and fuel tank volume. Further, in applying a vacuum to the fuel tank, the vacuum pump draws fuel vapor into the fuel vapor canister. This may require an increase in canister size and/or the addition of an additional bleed canister in order to prevent bleed emissions in hybrid vehicles, which have limited opportunities to purge the canister for the same reasons a vacuum pump is required in the first place.

FIG. 3 shows an example flow chart for a high-level method 300 for performing an evaporative emissions leak test in a hybrid-electric vehicle. More specifically, method 300 describes a method for performing an evaporative emissions leak test without the use of a vacuum pump, and without loading a fuel vapor canister above a threshold. Method 300 will be described in reference to the systems described in FIGS. 1-2, though it should be understood that method 300 may be applied to other systems without departing from the scope of this disclosure. Method 300 may be carried out by a controller, such as controller 212, and may be stored as executable instructions in non-transitory memory.

Method 300 begins at 305 by evaluating operating conditions. Operating conditions may be estimated, measured, and/or inferred, and may include ambient conditions, such as temperature, humidity, barometric pressure, etc., engine conditions, such as engine operating status, engine speed, engine load, etc., as well as fuel system conditions, such as fuel level, fuel tank pressure, fuel vapor canister load status, etc. Continuing at 310, method 300 may include determining whether the vehicle is in a vehicle-on state. If the vehicle is in a vehicle-on state, method 300 may proceed to 312. At 312, method 300 may include entering a vehicle-on leak test. An example vehicle-on leak test is described further herein and with regards to FIGS. 4 and 5. Method 300 may then end.

If the vehicle is not in a vehicle-on state, method 300 may proceed to 315. At 315, method 300 may include determining whether the vehicle soak duration is greater than a threshold. The vehicle soak duration may comprise the length of time elapsed from the most recent vehicle-off event. The vehicle soak duration threshold may be predetermined (e.g., 4-6 hours) or may be based on operating conditions. For example, the vehicle soak duration may be based on the ambient temperature, a change in ambient temperature during the vehicle soak duration, an expected change in ambient temperature during the vehicle soak based on the time of day, an amount of heat rejected to the fuel tank during the previous vehicle-on condition, which may in turn be based on engine operating conditions during the previous vehicle-on condition, etc. For vehicles with an isolated fuel tank, the vehicle soak duration threshold may be based on an expected amount of time necessary for the fuel tank to undergo a threshold change in temperature, and thus develop either a positive pressure or a vacuum there within. If the vehicle soak duration is less than the threshold, method 300 may proceed to 317. At 317, method 300 may include maintaining the fuel tank isolated for the threshold duration. The fuel tank may be isolated by maintaining a fuel tank isolation valve closed. The vehicle controller may be put to sleep and re-awoken while maintaining the fuel tank isolation valve closed.

When the vehicle soak duration has increased above the threshold, method 300 may proceed to 320. At 320, method 300 may include determining whether the absolute fuel tank pressure is greater than a threshold. Absolute fuel tank pressure may be estimated, inferred, or measured, for example by FTPT 291. The absolute fuel tank pressure threshold may be based on operating conditions, such as ambient barometric pressure, fuel fill level and fuel composition. The absolute fuel tank pressure threshold may be based on a pressure/vacuum that would be indicative of an intact fuel tank. In other words, if the fuel tank included a leak of a threshold size, the threshold pressure/vacuum would be unlikely to be reached.

However, an absolute fuel tank pressure below the threshold may not necessarily be indicative of degradation. Rather, the fuel tank may be at a zero-crossing point of the diurnal cycle. As the ambient temperature increases and decreases throughout the diurnal cycle, there may be two or more instances over a 24 hour cycle where an intact fuel tank has a fuel tank pressure that is equal to the ambient barometric pressure. As such, if the absolute fuel tank pressure is not greater than the pressure threshold, method 300 may proceed to 322. At 322, method 300 may include sleeping the controller for a duration, and then re-awakening the controller. The sleeping duration may be predetermined (e.g., 3 hours) or may be based on ambient conditions, such as ambient temperature and time of day. The sleeping duration may be based on a length of time over which a change in fuel tank pressure would be expected for an intact fuel tank. Continuing at 325, method 300 may include determining whether the absolute fuel tank pressure is greater than a threshold. The absolute fuel tank pressure threshold may be based the same as the threshold described at 320, or may be adjusted based on updated current operating conditions, such as ambient temperature and barometric pressure. If the absolute fuel tank pressure is not greater than the threshold, method 300 may proceed to 327. At 327, method 300 may include indicating fuel tank degradation. Indicating fuel tank degradation may include setting a flag at controller 212, and may further include indicating degradation to the vehicle user, such as via illuminating a malfunction indicator lamp (MIL). Controller 212 may take further mitigating action based on fuel tank degradation, such as preventing the vehicle from operating in an engine-only mode. Controller 212 may further adjust the evaporative emissions leak testing schedule. Method 300 may then end.

If the absolute fuel tank pressure is greater than the threshold, at either 320 or 325, method 300 may proceed to 330. At 330, method 300 may include indicating that the fuel tank is intact. Indicating that the fuel tank is intact may include recording a passing test result at controller 212.

Continuing at 335, method 300 may include isolating the fuel vapor canister. Isolating the fuel vapor canister may include closing a canister vent valve, such as CVV 297. Isolating the fuel vapor canister may further include closing, or maintaining closed a canister purge valve, such as CPV 261, as well as maintaining FTIV 252 closed. Continuing at 340, method 300 may include determining whether the fuel tank is holding a vacuum. If the fuel tank is holding a vacuum, the fuel tank vacuum may be exploited to test the canister side of the emissions system for leaks. If the fuel tank is not holding a vacuum, method 300 may proceed to 345. At 345, method 300 may include determining whether the canister load is below a threshold. If the canister load is below a threshold, the positive pressure within the fuel tank may be exploited to test the canister side of the emissions system for leaks without saturating the canister and increasing the likelihood of bleed emissions. The canister load threshold may be predetermined (e.g., 10% full) or may be based on operating conditions, such as fuel tank pressure, fuel composition, fuel fill level, ambient temperature, and/or other conditions that would indicate the expected canister load following venting the fuel tank to the isolated fuel vapor canister, and the likelihood that the adsorbed hydrocarbons would result in bleed emissions, which may be based on driver operating behavior, expected vehicle soak duration, time of day, ambient temperature, etc.

If the fuel tank is holding a vacuum, or the fuel tank is holding a positive pressure and the fuel vapor canister load is below a threshold, method 300 may proceed to 350. At 350, method 300 may include coupling the fuel tank to the fuel vapor canister. For example, fuel tank isolation valve 252 may be opened. When the fuel tank pressure and fuel vapor canister pressure have equilibrated, (as determined by FTPT 291 and VLPT 232, for example) method 300 may proceed to 355. In some examples, the fuel tank isolation valve may be closed following equilibration. At 355, method 300 may include determining whether the canister pressure rate of change is less than a threshold. A threshold amount of vacuum bleed-up or pressure bleed-down may be allowed for a given threshold leak size. If the canister pressure rate of change is greater than the threshold, method 300 may proceed to 357. At 357, method 300 may include indicating canister-side degradation. Indicating canister-side degradation may include setting a flag at controller 212, and may further include indicating degradation to the vehicle user, such as via illuminating a malfunction indicator lamp (MIL). Controller 212 may take further mitigating action based on canister degradation, such as preventing the vehicle from venting the fuel tank, and/or adjusting the canister purge schedule. Controller 212 may further adjust the evaporative emissions leak testing schedule, for example, by indicating more specific canister side degradation testing, such as canister vent valve and/or canister purge valve integrity testing.

If the canister pressure rate of change is less than the threshold, method 300 may proceed to 359. At 359, method 300 may include indicating that the canister side is intact. Indicating that the canister side is intact may include recording the passing test at controller 212. When the integrity of the canister side of the emissions control system has been determined, method 300 may proceed to 360. At 360, method 300 may include coupling the canister to atmosphere (e.g., opening CVV 297), and may further include closing the FTIV (if open). Method 300 may then end.

Returning to 345, if the fuel tank is holding a positive pressure, and the fuel vapor canister load is above a threshold, method 300 may proceed to 365. At 365, method 300 may include spinning the engine unfueled. For example, the engine may be started with motor assistance and spun with no air or fuel injected into the engine cylinders to generate intake vacuum. Continuing at 370, method 300 may include coupling the isolated fuel vapor canister to engine intake responsive to engine intake vacuum increasing above a threshold. For example, the canister purge valve may be opened. In some examples, the engine may continue to spin unfueled while the canister is coupled to intake. Any desorbed fuel vapor may be adsorbed in the intake by AIS HC 224, preventing escape emissions. The integrity of the fuel vapor canister may be determined by comparing a resulting canister pressure to a threshold indicative of an intact canister side of the emissions control system.

In other examples, engine rotation may be stopped when a canister pressure reaches a threshold vacuum, and the canister purge valve closed to isolate the canister side of the emissions control system. Continuing at 375, method 300 may include may include determining whether the canister pressure rate of change (vacuum bleed-up) is less than a threshold. If the canister pressure rate of change is greater than the threshold, method 300 may proceed to 377. At 377, method 300 may include indicating canister-side degradation. If the canister pressure rate of change is less than the threshold, method 300 may proceed to 379. At 379, method 300 may include indicating that the canister side is intact. When the integrity of the canister side of the emissions control system has been determined, method 300 may proceed to 380. At 380, method 300 may include closing the CPV (if open), stopping engine rotation (if still spinning), and coupling the canister to atmosphere (e.g., opening CVV 297). Method 300 may then end.

FIG. 4 shows an example flow chart for a high-level method 400 for performing an evaporative emissions leak test in a hybrid-electric vehicle during a vehicle-on condition. Method 400 may be executed independently, or as a subroutine of another method, such as method 300. Method 400 will be described in reference to the systems described in FIGS. 1-2, though it should be understood that method 400 may be applied to other systems without departing from the scope of this disclosure. Method 400 may be carried out by a controller, such as controller 212, and may be stored as executable instructions in non-transitory memory.

Method 400 begins at 405 by evaluating operating conditions. Operating conditions may be estimated, measured, and/or inferred, and may include ambient conditions, such as temperature, humidity, barometric pressure, etc., engine conditions, such as engine operating status, engine speed, engine load, etc., as well as fuel system conditions, such as fuel level, fuel tank pressure, fuel vapor canister load status, etc. Continuing at 410, method 400 may include determining whether the vehicle is in an engine-on state. If the vehicle is in an engine-on state, method 400 may proceed to 412. At 412, method 300 may include entering an engine-on leak test. An example engine-on leak test is described further herein and with regards to FIG. 5. Method 400 may then end.

If the engine is not on, method 400 may proceed to 415. At 415, method 400 may include determining whether the absolute fuel tank pressure is greater than a threshold, as described with regard to FIG. 3. If the absolute fuel tank pressure is greater than the threshold, method 400 may proceed to 417. At 417, method 400 may include indicating that the fuel tank is intact. Continuing at 419, method 400 may include isolating the fuel vapor canister, and proceeding with a canister-side integrity test. The canister side integrity test may proceed as described with regard to FIG. 3 from 335 onward. Method 400 may then end.

If the absolute fuel tank pressure is less than the threshold, method 400 may proceed to 420. At 420, method 400 may include spinning the engine unfueled to generate an engine intake vacuum. Continuing at 425, method 400 may include coupling the fuel vapor canister to engine intake responsive to engine intake vacuum increasing above a threshold, as described with regard to FIG. 3. Continuing at 430, method 400 may include determining whether a canister pressure rate of change is less than a threshold. If the canister pressure rate of change is greater than the threshold, method 400 may proceed to 432, and may include indicating canister-side degradation, as described with regard to FIG. 3. Continuing at 434, method 400 may include closing the CPV (if open), stopping engine rotation (if still spinning), and coupling the canister to atmosphere (e.g., opening CVV 297). Method 400 may further include setting a flag to follow up with a fuel tank integrity test when conditions permit. Method 400 may then end.

If the canister pressure rate of change is less than the threshold, method 400 may proceed to 434, and may include indicating that the canister side is intact. Continuing at 435, method 400 may include coupling the fuel tank to engine intake, for example, opening FTIV 252 and CPV 261. CVV 297 may be closed or maintained closed to isolate the evaporative emissions system from atmosphere. Continuing at 440, method 400 may include evacuating the fuel tank. This may include spinning the engine unfueled to evacuate the fuel tank. Any fuel vapor drawn through the fuel vapor canister into intake will be adsorbed by AIS HC 224, preventing bleed emissions. When the fuel tank is evacuated to a threshold vacuum, the fuel tank isolation valve may be closed. The CPV may also be closed, and the engine rotation may be stopped. However, in some examples, the engine may be continually spun unfueled while coupled to the fuel tank until the fuel tank reaches (or fails to reach after a predetermined duration) a threshold vacuum level.

Continuing at 445, method 400 may include determining whether the fuel tank pressure rate of change is less than a threshold. A threshold amount of vacuum bleed-up may be allowed for a given threshold leak size. If the fuel tank pressure rate of change is greater than the threshold, method 400 may proceed to 447. At 447, method 400 may include indicating fuel tank degradation, as described with regard to FIG. 3. If the fuel tank pressure rate of change is less than the threshold, method 400 may proceed to 449. At 449, method 400 may include indicating that the fuel tank is intact. When the integrity of the fuel tank has been determined and indicated, method 400 may proceed to 450. At 450, method 400 may include closing the FTIV (if open), CPV (if open), and stopping the rotating of the engine (if ongoing). Alternatively, method 400 may include opening the CVV and FTIV, and allowing the fuel tank to equilibrate to atmospheric pressure. The FTIV may then be closed. Method 400 may then end.

FIG. 5 shows an example flow chart for a high-level method 500 for performing an evaporative emissions leak test in a hybrid-electric vehicle during an engine-on condition. Method 500 may be executed independently, or as a subroutine of another method, such as methods 300 and/or 400. Method 500 will be described in reference to the systems described in FIGS. 1-2, though it should be understood that method 500 may be applied to other systems without departing from the scope of this disclosure. Method 500 may be carried out by a controller, such as controller 212, and may be stored as executable instructions in non-transitory memory.

Method 500 begins at 505 by evaluating operating conditions. Operating conditions may be estimated, measured, and/or inferred, and may include ambient conditions, such as temperature, humidity, barometric pressure, etc., engine conditions, such as engine operating status, engine speed, engine load, etc., as well as fuel system conditions, such as fuel level, fuel tank pressure, fuel vapor canister load status, etc. Continuing at 510, method 500 may include determining whether an absolute fuel tank pressure is greater than a threshold. If the absolute fuel tank pressure is not greater than the threshold, method 500 may proceed to 515. At 515, method 500 may include determining whether the intake manifold vacuum is greater than a threshold. Intake manifold vacuum may be estimated, inferred, or measured, such as by MAP sensor 236. The intake manifold vacuum threshold may be based on an amount of vacuum necessary to evacuate the canister side of the emissions control system, and/or the fuel tank. The intake manifold vacuum threshold may thus be based on the volumes of the canister side and/or fuel tank, and may be further based on fuel level, fuel composition, etc. If the intake manifold is not greater than the threshold, method 500 may proceed to 517. At 517, method 500 may include monitoring fuel tank pressure and intake manifold vacuum, and may further include setting a flag to follow up with additional leak testing when a threshold pressure gradient is present within the engine, fuel, and/or emissions control system.

Returning to 510, if the absolute fuel tank pressure is greater than the threshold, method 500 may proceed to 520. At 520, method 500 may include indicating that the fuel tank is intact. Continuing at 522, method 500 may include determining whether the intake manifold vacuum is greater than a threshold. If the intake manifold vacuum is greater than a threshold (as shown at either 515 or 522), method 500 may proceed to 525. At 525, method 500 may include sealing the canister from atmosphere, and may further include applying intake vacuum to the canister side of the emissions control system. Sealing the canister from atmosphere may include closing a canister vent valve, while applying intake vacuum to the canister may include opening a canister purge valve. The integrity of the fuel vapor canister may be determined by comparing a resulting canister pressure to a threshold indicative of an intact canister side of the emissions control system.

In other examples, the canister purge valve may be closed when a canister pressure reaches a threshold vacuum. Continuing at 530, method 500 may include may include determining whether the canister pressure rate of change (vacuum bleed-up) is less than a threshold. If the canister pressure rate of change is less than the threshold, method 500 may proceed to 532. At 532, method 500 may include indicating that the canister side is intact. If the canister pressure rate of change is greater than the threshold, method 500 may proceed to 534. At 534, method 500 may include indicating that the canister side is intact. When the integrity of the canister side of the emissions control system has been determined, method 500 may proceed to 535. At 535, method 500 may include closing the CPV (if open), and coupling the canister to atmosphere (e.g., opening CVV 297). Method 500 may then end.

Returning to 522, if the absolute fuel tank pressure is greater than a threshold and the intake manifold vacuum is less than a threshold, method 500 may proceed to 540. At 540, method 500 may include isolating the fuel vapor canister (e.g., closing the CPV and CVV). Continuing at 545, method 500 may include coupling the fuel tank to the fuel vapor canister (e.g., opening the FTIV), and allowing the fuel tank pressure and fuel vapor canister pressure to equilibrate. Continuing at 550, method 500 may include may include determining whether the canister pressure rate of change (vacuum bleed-up or pressure bleed-down) is less than a threshold. If the canister pressure rate of change is less than the threshold, method 500 may proceed to 552. At 552, method 500 may include indicating that the canister side is intact. If the canister pressure rate of change is greater than the threshold, method 500 may proceed to 554. At 554, method 500 may include indicating that the canister side is intact. When the integrity of the canister side of the emissions control system has been determined, method 500 may proceed to 555. At 55s5, method 500 may include closing the CPV (if open), and coupling the canister to atmosphere (e.g., opening CVV 297). Method 500 may then end.

The systems described herein and depicted in FIGS. 1 and 2, along with the methods described herein and depicted in FIGS. 3, 4, and 5 may enable one or more systems and one or more methods. In one example, a method for a fuel system is provided, comprising: during a first engine-off condition, coupling a fuel tank to a fuel vapor canister, and indicating degradation based on a change in pressure at the fuel vapor canister, and during a second engine-off condition, coupling the fuel vapor canister to an intake of an engine, and indicating degradation based on a change in pressure at the fuel vapor canister. In such an example, the first engine-off condition may include an absolute fuel tank pressure greater than a threshold, and wherein the second engine-off condition includes an absolute fuel tank pressure that is less than a threshold. In some examples, the first engine-off condition may include a fuel tank vacuum, and the method may further comprise: maintaining coupling of the fuel tank and the fuel vapor canister until a pressure in the fuel tank is equal to a pressure in the fuel vapor canister; and indicating degradation based on a change in a canister pressure bleed-up rate that is greater than a threshold. In some examples, the first engine-off condition may include a positive fuel tank pressure and a canister load that is less than a threshold, and the method may further comprise: maintaining coupling of the fuel tank and the fuel vapor canister until a pressure in the fuel tank is equal to a pressure in the fuel vapor canister; and indicating degradation based on a change in a canister pressure bleed-down rate that is greater than a threshold. In some examples, the method may additionally or alternatively further comprise: during the second engine-off condition, spinning the engine unfueled, and coupling the fuel vapor canister to the intake of the engine responsive to an intake vacuum increasing above a threshold. The method may further comprise uncoupling the fuel vapor canister from the intake of the engine responsive to a canister vacuum increasing above a threshold, and indicating degradation based on a change in a canister pressure bleed-up rate that is greater than a threshold. In some examples, coupling the fuel tank to the fuel vapor canister may comprise opening a fuel tank isolation valve coupled between the fuel tank and the fuel vapor canister. Coupling the fuel vapor canister to the intake of the engine may include opening a canister purge valve coupled between the fuel vapor canister and the intake of the engine. The first and second engine-off conditions may include a fuel vapor canister that is isolated from atmosphere. The technical result of implementing such methods is that a vacuum or pressure may be applied to the fuel vapor canister during an engine-off condition without requiring a dedicated vacuum pump coupled to the fuel vapor canister. This may reduce manufacturing costs and system complexity, while maintaining adherence to federal emissions guidelines.

In another example, a method for a fuel system is provided, comprising: during a first condition, responsive to a first absolute fuel tank pressure being less than a threshold, maintaining a fuel tank sealed for a threshold duration; indicating degradation of the fuel tank responsive to a second absolute fuel tank pressure being less than the threshold; responsive to the first absolute fuel tank pressure being greater than the threshold, coupling a fuel tank to a fuel vapor canister; and indicating degradation based on a change in pressure at the fuel vapor canister. In such an example, coupling the fuel tank to the fuel vapor canister may comprise coupling the fuel tank to the fuel vapor canister responsive to a fuel tank vacuum. In some examples, coupling the fuel tank to the fuel vapor canister may comprise coupling the fuel tank to the fuel vapor canister responsive to a positive fuel tank vacuum and further responsive to a canister load being less than a threshold. The method may further comprise: responsive to a positive fuel tank vacuum and a further responsive to the canister load being greater than the threshold, spinning an engine unfueled; coupling the fuel vapor canister to engine intake responsive to an intake vacuum increasing above a threshold; and indicating degradation based on a change in pressure at the fuel vapor canister. The first condition may include a vehicle-off condition, and may further include a vehicle-off soak duration greater than a threshold. In some examples, the method may further comprise: during a second condition, the second condition including a vehicle-on condition, an engine-off condition, and an absolute fuel tank pressure less than a threshold, spinning an engine unfueled; coupling the fuel vapor canister to engine intake responsive to an intake vacuum increasing above a threshold; and indicating degradation based on a change in pressure at the fuel vapor canister. The technical result of implementing such methods is passive testing of the fuel tank and fuel vapor canister using fuel tank pressure accumulated over a diurnal cycle. In this way, the canister side of an emissions control system may be tested without saturating the fuel vapor canister with hydrocarbons, thereby decreasing bleed emissions without requiring an increase in canister size or the addition of an additional bleed canister.

In yet another example, a system for a hybrid-electric vehicle is provided, comprising: a fuel tank coupled to a fuel vapor canister via a fuel tank isolation valve; an engine intake coupled to the fuel vapor canister via a canister purge valve; a canister vent coupling the fuel vapor canister to atmosphere via a canister vent valve; a fuel tank pressure sensor coupled to the fuel tank; a canister vent pressure sensor coupled within the canister vent; and a controller configured with instructions stored in non-transitory memory, that when executed, cause the controller to: during a first engine-off condition, open the fuel tank isolation valve while maintaining the canister purge valve and canister vent valve closed, and indicate degradation based on a change in pressure at the canister vent pressure sensor; and during a second engine-off condition, open the canister purge valve while maintaining the canister vent valve and fuel tank isolation valve closed, and indicate degradation based on a change in pressure at the fuel vapor canister. In such an example, the system may not include a vacuum pump coupled to the fuel vapor canister. In some examples, the first engine-off condition may include an absolute fuel tank pressure greater than a threshold, and the second engine-off condition may include an absolute fuel tank pressure that is less than a threshold. The first engine-off condition may include a fuel tank vacuum, and the controller may further comprise instructions stored in non-transitory memory, that when executed, cause the controller to: maintain the fuel tank isolation valve open until a pressure in the fuel tank is equal to a pressure in the fuel vapor canister; and indicate degradation based on a change in a canister pressure bleed-up rate that is greater than a threshold. In some examples, the first engine-off condition may include a positive fuel tank pressure and a canister load that is less than a threshold, and the controller further may comprise instructions stored in non-transitory memory, that when executed, cause the controller to: maintain the fuel tank isolation valve open until a pressure in the fuel tank is equal to a pressure in the fuel vapor canister; and indicate degradation responsive to a change in a canister pressure bleed-down rate that is greater than a threshold. The technical result of implementing this system is that canister side leaks may be tested independently of the fuel tank pressure sensor, due to coupling separate pressure sensors to the fuel tank side and the canister side of the emissions control system. In this way, the fuel tank may remained sealed during some canister-side degradation tests, thereby maintaining fuel vapor isolated and reducing the transfer of fuel vapor to the fuel vapor canister, thus reducing potential bleed emissions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to “an” element or “a first” element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:

during an engine-off event:

in a first condition, including a fuel tank absolute pressure greater than a threshold where a fuel tank is isolated from a fuel vapor canister, coupling the fuel tank to the fuel vapor canister while sealing the canister and fuel tank from an engine intake manifold and atmosphere, and indicating degradation based on a first change in pressure at the fuel vapor canister; and in a second condition, if fuel tank absolute pressure is less than the threshold where the fuel tank is isolated from the fuel vapor canister, coupling the fuel vapor canister to an engine intake while maintaining the fuel tank sealed from atmosphere and the fuel vapor canister, and indicating degradation based on a second change in pressure at the fuel vapor canister.

2. The method of claim 1, wherein the first condition includes a fuel tank vacuum, and wherein the method further comprises:

maintaining coupling of the fuel tank and the fuel vapor canister until a pressure in the fuel tank is equal to a pressure in the fuel vapor canister and then sealing the fuel tank from the fuel vapor canister; and indicating degradation based on a change in a canister pressure bleed-up rate that is greater than a threshold.

3. The method of claim 1, wherein the first condition includes a positive fuel tank pressure and a canister load that is less than a threshold, and wherein the method further comprises:

maintaining coupling of the fuel tank and the fuel vapor canister until a pressure in the fuel tank is equal to a pressure in the fuel vapor canister and then sealing the fuel tank from the fuel vapor canister, the fuel vapor canister sealed from the engine intake; and indicating degradation based on a change in a canister pressure bleed-down rate that is greater than a threshold.

4. The method of claim 1, further comprising:

during the second condition, spinning the engine unfueled; and coupling the fuel vapor canister to the engine intake responsive to an intake vacuum increasing above a threshold.

5. The method of claim 4, further comprising:

uncoupling the fuel vapor canister from the engine intake responsive to a canister vacuum increasing above a threshold, and indicating degradation based on a change in a canister pressure bleed-up rate that is greater than a threshold.

6. The method of claim 1, wherein coupling the fuel tank to the fuel vapor canister comprises opening a fuel tank isolation valve coupled between the fuel tank and the fuel vapor canister.

7. The method of claim 1, wherein coupling the fuel vapor canister to the engine intake includes opening a canister purge valve coupled between the fuel vapor canister and the engine intake.

8. The method of claim 1, wherein the first and second conditions include a fuel vapor canister that is isolated from atmosphere.

9. A method for a fuel system, comprising:

during a first condition, including a vehicle-off condition, where the vehicle-off condition includes a vehicle-off soak duration greater than a threshold, responsive to a first absolute fuel tank pressure being less than a threshold, maintaining a fuel tank sealed from atmosphere and from a fuel vapor canister for a threshold duration based on ambient temperature and/or time of day;

indicating degradation of the fuel tank responsive to a second absolute fuel tank pressure being less than the threshold;

responsive to the first absolute fuel tank pressure being greater than the threshold, coupling the fuel tank to the fuel vapor canister by actuating a fuel tank isolation valve positioned between the fuel tank and the fuel vapor canister while maintaining the fuel vapor canister sealed from an intake manifold of an engine and from atmosphere; and indicating degradation based on a change in pressure at the fuel vapor canister.

10. The method of claim 9, wherein coupling the fuel tank to the fuel vapor canister comprises coupling the fuel tank to the fuel vapor canister responsive to a fuel tank vacuum.

11. The method of claim 9, wherein coupling the fuel tank to the fuel vapor canister comprises coupling the fuel tank to the fuel vapor canister responsive to a positive fuel tank pressure and further responsive to a canister load being less than a threshold.

12. The method of claim 11, further comprising:

responsive to the positive fuel tank pressure and further responsive to the canister load being greater than the threshold, spinning an engine unfueled;

coupling the fuel vapor canister to an engine intake responsive to an intake vacuum increasing above a threshold; and indicating degradation based on a change in pressure at the fuel vapor canister.

13. The method of claim 9, further comprising:

during a second condition, the second condition including a vehicle-on condition, an engine-off condition, and an absolute fuel tank pressure less than a threshold, spinning an engine unfueled;

coupling the fuel vapor canister to an engine intake responsive to an intake vacuum increasing above a threshold, where the fuel vapor canister is sealed from the fuel tank; and indicating degradation based on a change in pressure at the fuel vapor canister.

14. A system for a hybrid-electric vehicle, comprising:

a fuel tank coupled to a fuel vapor canister via a fuel tank isolation valve;

an engine intake coupled to the fuel vapor canister via a canister purge valve;

a canister vent coupling the fuel vapor canister to atmosphere via a canister vent valve;

a fuel tank pressure sensor coupled to the fuel tank;

a canister vent pressure sensor coupled within the canister vent; and a controller configured with instructions stored in non-transitory memory, that when executed, cause the controller to:

during a first engine-off condition, open the fuel tank isolation valve while maintaining the canister purge valve and canister vent valve closed, and indicate degradation based on a change in pressure at the canister vent pressure sensor; and during a second engine-off condition, open the canister purge valve while maintaining the canister vent valve and fuel tank isolation valve closed, and indicate degradation based on a change in pressure at the fuel vapor canister.

15. The system of claim 14, wherein the second engine-off condition comprises spinning the engine unfueled to generate vacuum in the engine intake, and wherein the vacuum is applied to the fuel vapor canister via the open canister purge valve; and responsive to an indication of an absence of degradation at the fuel vapor canister:

opening the fuel tank isolation valve and spinning the engine unfueled to generate vacuum in the fuel tank;

sealing the fuel tank from the fuel vapor canister responsive to vacuum in the fuel tank reaching a threshold vacuum by commanding closed the fuel tank isolation valve; and indicating degradation of the fuel tank and not the fuel vapor canister based on a change in pressure at the fuel tank.

16. The system of claim 14, wherein the first engine-off condition includes an absolute fuel tank pressure greater than a threshold prior to commanding open the fuel tank isolation valve, the threshold fuel tank pressure indicating that the fuel tank is intact and free from degradation, and wherein the second engine-off condition includes an absolute fuel tank pressure that is less than the threshold while the fuel tank isolation valve is closed.

17. The system of claim 16, wherein the first engine-off condition includes a fuel tank vacuum, and wherein the controller further comprises instructions stored in non-transitory memory, that when executed, cause the controller to:

maintain the fuel tank isolation valve open until a pressure in the fuel tank is equal to a pressure in the fuel vapor canister and then close the fuel tank isolation valve to seal the fuel vapor canister from the fuel tank; and indicate degradation based on a change in a canister pressure bleed-up rate that is greater than a threshold.

18. The system of claim 16, wherein the first engine-off condition includes a positive fuel tank pressure and a canister load that is less than a threshold, and wherein the controller further comprises instructions stored in non-transitory memory, that when executed, cause the controller to:

maintain the fuel tank isolation valve open until a pressure in the fuel tank is equal to a pressure in the fuel vapor canister and then close the fuel tank isolation valve to seal the fuel vapor canister from the fuel tank; and indicate degradation responsive to a change in a canister pressure bleed-down rate that is greater than a threshold.

* * * * *